(12) United States Patent
Nicholson, Jr.

(10) Patent No.: US 10,431,126 B2
(45) Date of Patent: Oct. 1, 2019

(54) TEMPERATURE VALIDATION SLIDE

(71) Applicant: Barry Nicholson, Jr., San Antonio, TX (US)

(72) Inventor: Barry Nicholson, Jr., San Antonio, TX (US)

( * ) Notice: Subject to any disclaimer, the term of this patent is extended or adjusted under 35 U.S.C. 154(b) by 0 days.

(21) Appl. No.: 15/945,326

(22) Filed: Apr. 4, 2018

(65) Prior Publication Data

US 2018/0342181 A1     Nov. 29, 2018

Related U.S. Application Data

(60) Provisional application No. 62/509,738, filed on May 23, 2017.

(51) Int. Cl.
| | |
|---|---|
| *G01K 11/12* | (2006.01) |
| *G09F 3/00* | (2006.01) |
| *G01K 1/14* | (2006.01) |
| *G09F 3/10* | (2006.01) |
| *G06K 19/06* | (2006.01) |
| *G06K 7/14* | (2006.01) |
| *G01K 1/02* | (2006.01) |
| *G01K 3/00* | (2006.01) |
| *G09F 3/02* | (2006.01) |

(52) U.S. Cl.
CPC ........... *G09F 3/0294* (2013.01); *G01K 1/024* (2013.01); *G01K 1/143* (2013.01); *G01K 3/005* (2013.01); *G01K 11/12* (2013.01); *G06K 7/1417* (2013.01); *G06K 19/0615* (2013.01); *G06K 19/06037* (2013.01); *G09F 3/0297* (2013.01); *G09F 3/10* (2013.01); *G09F 2003/0211* (2013.01)

(58) Field of Classification Search
CPC .......... G01K 11/12; G01K 13/00; G01K 1/02; B29C 66/91218; Y10S 252/962; G01N 21/78; G01N 31/22; G01N 33/02
USPC ....... 374/162, 208, 100, 161, 130, 101, 120, 374/106; 116/216; 340/870.17
See application file for complete search history.

(56) References Cited

U.S. PATENT DOCUMENTS 4,072,055 A * 2/1978 Elliott .................... G01K 11/06
374/159
4,156,365 A * 5/1979 Heinmets ........... A47G 19/2227
374/141
(Continued)

FOREIGN PATENT DOCUMENTS

CN        1035233138      *  5/2015
CN        206166595 U     *  5/2017
(Continued)

*Primary Examiner* — Gail Kaplan Verbitsky
(74) *Attorney, Agent, or Firm* — Eric A. Hinojosa

(57) ABSTRACT

This disclosure describes an enhanced temperature validation slide comprising a substrate and a removable label attached to the substrate with an adhesive. In some implementations, the label comprises at least two threshold temperature indicators, a transparent liquid impermeable barrier layer, a designated area for user generated information, an area for displayed information (i.e. a lot number), an area for displayed text or graphics linked to information stored online (i.e. a QR code), and a thermo-chromic visual indicator area. The various implementations of this disclosure may describe a validation slide utilizing any number of the features described above in any combination.

19 Claims, 6 Drawing Sheets

(56) References Cited

U.S. PATENT DOCUMENTS

| | | | | |
|---|---|---|---|---|
| 4,524,778 | A * | 6/1985 | Brown, Jr. | A61B 5/015 374/E11.022 |
| 4,538,926 | A * | 9/1985 | Chretien | G01K 11/165 374/150 |
| 5,135,795 | A * | 8/1992 | Gregory | C03C 8/02 428/195.1 |
| 5,218,834 | A * | 6/1993 | Major | F17C 13/02 374/143 |
| 5,997,927 | A * | 12/1999 | Gics | G01K 3/04 116/207 |
| 6,015,341 | A * | 1/2000 | Faraj | B60H 1/24 454/152 |
| 6,103,351 | A * | 8/2000 | Ram | G01K 3/04 116/219 |
| 6,260,414 | B1 * | 7/2001 | Brown | G01F 23/22 73/295 |
| 6,410,896 | B2 * | 6/2002 | Witonsky | A61J 9/02 116/216 |
| 6,579,006 | B1 * | 6/2003 | Pariseau | G01K 1/16 116/216 |
| 7,258,073 | B2 * | 8/2007 | McGuire | G01K 1/02 116/216 |
| 7,364,357 | B2 * | 4/2008 | Wu | A47J 45/068 374/141 |
| 7,600,912 | B2 * | 10/2009 | Leute | G01K 3/005 374/157 |
| 8,596,863 | B2 * | 12/2013 | Lescanec | A47J 27/022 116/216 |
| 9,271,875 | B2 * | 3/2016 | Freer | A61F 13/0233 |
| 9,581,504 | B2 * | 2/2017 | Patel | G01K 3/04 |
| 2003/0128737 | A1 * | 7/2003 | McGrath | G01K 11/20 374/161 |
| 2004/0134823 | A1 * | 7/2004 | Bitsonis | G01K 3/04 206/459.1 |
| 2005/0257668 | A1 * | 11/2005 | Mishima | G10H 1/0008 84/612 |
| 2007/0015975 | A1 * | 1/2007 | Faries, Jr. | G06F 19/00 600/300 |
| 2008/0142529 | A1 * | 6/2008 | LaGuardia | B65D 81/3874 220/592.2 |
| 2009/0284732 | A1 * | 11/2009 | Vitale | B65D 23/16 356/51 |
| 2010/0192833 | A1 * | 8/2010 | Yang | G01K 11/06 116/217 |
| 2011/0018788 | A1 * | 1/2011 | Tanaka | H01L 51/5246 345/80 |
| 2013/0014415 | A1 * | 1/2013 | Morrish | A47G 1/0633 40/773 |
| 2016/0145024 | A1 * | 5/2016 | Pezzoli | B65B 61/18 206/459.5 |

FOREIGN PATENT DOCUMENTS

| | | | | |
|---|---|---|---|---|
| JP | 4198348 | B2 * | 12/2008 | |
| JP | 3166758 | U * | 3/2011 | G01K 11/12 |

* cited by examiner

TEMPERATURE VALIDATION SLIDE

CROSS-REFERENCE TO RELATED APPLICATIONS

This application claims the benefit of a provisional application No. 62/509,738 submitted and received May 23, 2017.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

Certain lab equipment and instruments are used in research and medical diagnostic work performed on specimens mounted on slides. An example of such an instrument is an automated IHC slide stainer. The control of the temperature of the slide is of critical importance to the observation process. For that reason, these instruments often rely on a temperature controlled pad that receives the slides. Independent temperature validation is commonly required to ensure proper functioning. For many US labs, a failure to maintain accurate logs of independent temperature validation will result in fines, penalties, or loss of certification. Without the independent validation, the temperature of the slide pad cannot be trusted to be accurate. There are many negative consequences associated with an incorrect pad temperature. For example, an incorrect pad temperature can alter, compromise, or even destroy the specimen mounted on a slide. Sometimes, the changes and/or damage may be falsely attributed to the specimen resulting in false data being observed and used for the work to which the specimen was provided. In a medical lab setting, a temperature error of only a few degrees may lead to misdiagnosis or a failure to accurately diagnose a tissue sample.

Presently, existing validation slides can be used to perform an independent temperature validation of certain instruments. These prior art validation slides are comprised of a glass slide and a small pair of threshold temperature indicators applied to the surface via adhesive. However, the current validation slides are lacking in many functional respects. For example, if a single droplet of liquid contacts the surface of the prior art validation slide threshold temperature indicator, then the slide is ruined. If the prior art slide is defective, there is no way to track the source. The small surface area of the temperature indicator of the prior art fails to detect hot-spots or unevenly heated areas of the slide pad of the instrument. The prior art has no individual slide tracking and identification for temperature testing and validation records. In short, the prior art fails in functional respects such as ease of identification, batch tracking, accurate measurement, and resistance to the typical environmental conditions—yet, the cost for these validation slides is high. The following disclosure relates to an improved product for the independent validation of the temperature at the slide pad of heated pad instruments.

BRIEF SUMMARY

It is a goal of the present disclosure to provide an enhanced temperature validation slide of both standard and non standard dimensions for use in a variety of applications and on a wide variety of slide-using instruments.

It is a goal of the present disclosure to increase the ease of use and the ease of record logging by featuring a slide that comprises a removable label that can be entered into the quality control maintenance logbook.

It is a goal of the present disclosure to increase the durability and reduce the failure rate of the validation slide by featuring a label that comprises a substantially impermeable barrier to liquids and gasses.

It is a further goal to enhance the accuracy of the validation by featuring a label that comprises a threshold temperature indicator that covers a greater surface area of the slide than the prior art.

It is a further goal to enhance the accuracy of the validation by featuring a label that comprises a visual temperature indicator, such as a thermo-chromic ink border that covers at least a portion of the surface area of the slide.

It is a further goal to enhance the user's ability to track and identify the validation slide by featuring a label that comprises an area for the user to input information (i.e. a designated space to write on), It is a further goal to enhance the user's ability to track and identify the validation slide by featuring a label that comprises an area for displayed information such as manufacturing tags (i.e. a lot number)

It is a further goal to enhance the user's ability to track and identify the validation slide by featuring a label that comprises an area for ready access to information stored online (i.e. a printed QR code that when scanned by the user using a QR code reader will direct the user to a product specification page via an internet connection).

DETAILED DESCRIPTION

At a high level, the validation slide of the present disclosure comprises a substrate and a label. The label of the validation slide comprises at least one threshold temperature indicator. The label of the validation slide additionally comprises information. The label of the validation slide additionally comprises at least one surface area for the user to optionally add information. The label of the validation slide additionally comprises an adhesive backing so that the label can be reversibly removed from the substrate. The label of the validation slide additionally comprises an impermeable barrier layer that resists or prevents passage or absorption of liquids by the label. In some implementations, the information is not physically displayed on the slide, but is stored online and accessed by the user by scanning an image or text displayed on the validation slide with a scanner equipped with an internet connection, such as a smart phone, tablet, or similar computer device. In some implementations, the validation slide further comprises a QR code; in other implementations, the validation slide further comprises a barcode.

The substrate is preferentially comprised of glass, though composition of the substrate could be selected from among other suitable materials of composition that are known in the art, such as plastic. The substrate shape comprises a generally flat rectangular prism. Rectangular prisms have six faces forming the outer surface, of which at least four are rectangles. In some implementations, the substrate has dimensions known in the industry as standard slide dimensions. In other implementations the substrate has nonstandard dimensions compared to the industry standard dimensions. The preferred implementation comprises a substrate that closely replicates the composition and dimensions of the slide that is typically used with the instrument that is to be temperature validated. In other words, the preferred implementation comprises a substrate that is adapted to be used with instruments that use slides and require temperature validation.

For clarity of this disclosure, note that the substrate comprises an outer surface area that will be discussed as having a downward facing surface area and an upward facing surface area positioned substantially parallel to one another, wherein the upward facing surface area is comprised by one of the two sides of greatest surface area of the generally rectangular prism, and the downward facing surface area is comprised by the other of the two sides of greatest surface area. If directions such as inward or outward are used they refer to the dimension perpendicular to the plane of the figures and drawings such that inward is away from the reader and outward is towards the reader.

Figure 1:
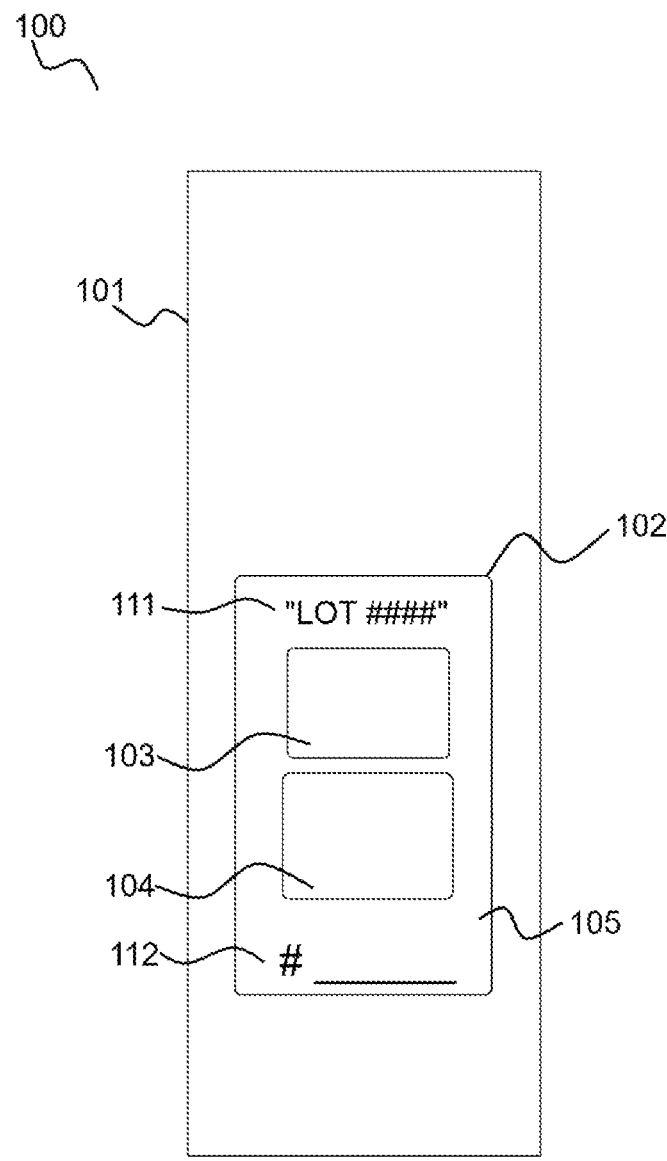
FIG. 1 depicts a first implementation of the temperature validation slide.

FIG. 1 shows a first implementation in which slide 100 comprises substrate 101 and label 102, where label 102 is positioned on the upward facing surface area of substrate 101. Label 102 further comprises a first threshold temperature indicator 103, a second threshold temperature indicator 104, a barrier layer 105, a first area 111 displaying a first set of information, a second area 112 capable of receiving information, and an adhesive layer 115. The adhesive layer 115 attaches the label 102 to the substrate 101. Upon reading the present disclosure, many different position arrangements of the functional elements disclosed above will become known to one having ordinary skill in the art. However, a preferred arrangement of the functional elements, seen in FIG. 1, is to first have a base comprised of the adhesive layer 115 at the inward most facing side of the label 102. Then moving outward from the back, there is an inner layer wherein the first and second threshold temperature indicators 103 and 104 are positioned substantially adjacently leaving room for the first and second areas 111 and 112 between the edge of the label 102 and the edge of the temperature indicators 103 and 104. And finally, the barrier layer 105 defines the outermost facing layer of the label, encapsulating and protecting the label 102.

Still referencing slide 100 shown in FIG. 1, the first area 111 displays a first set of information. Upon reading the present disclosure, it will be understood by one having ordinary skill in the art that this first set of information can comprise many important or useful items of information such as production batch identifying marks, serial numbers, model numbers, branding information, etc. This first set of information enables the tracking and accountability of the slide, which is important for the test record keeping. In some implementations, this first set of information is displayed as print. In some implementations, the first set of information relates to the manufacturing process of the validation slide. In other implementations, the first set of information relates to a unique identifier for the validation slide. In other implementations, the first set of information relates to the properties of the validation slide, such as the threshold temperature of an indicator. In some implementations, the first set of information comprises some combination the previously described information. In some implementations, the first set of information is not physically displayed on the slide, but is stored online and accessed by the user by scanning an image or text displayed on the validation slide with a scanner equipped with an internet connection, such as a smart phone, tablet, or similar computer device.

Still referencing slide 100 shown in FIG. 1, the second area 112 is capable of receiving information. Upon reading the present disclosure, it will be understood by one having ordinary skill in the art that this information can comprise many important or useful items of information such as use dates, test log entry numbers, series numbers, user identification, etc. Furthermore, it will be further understood that this information can be received via hand writing, printed sticker, stamping, marking, etc. by the user. This information can be anything that the user wants to attach to the label of the validation slide. The received information on this second area further enables and enhances the tracking and accountability of the slide, which is important for the test record keeping. In some implementations, such as slide 100, second area 112 comprises a line printed on a white background.

Still referencing slide 100 shown in FIG. 1, the barrier layer 105 encapsulates and protects the sensitive first and second threshold temperature indicators 103 and 104 and the first area 111. A preferred material of construction is selected from the group comprising substantially optically transparent and heat resistant plastics. Of course upon reading the present disclosure, it will be understood by one having ordinary skill in the art that the material of construction may be selected from many other suitable materials such as resins, epoxies, other plastics, polymers, and monomers, to name a few. The barrier layer 105 keeps moisture and gasses from entering and fouling the first and second threshold temperature indicators 103 and 104.

In some implementations, the barrier layer is an additional transparent layer. In other implementations, the barrier layer is not an additional layer but integrally formed into the label and threshold temperature indicators.

Although slide 100 has been described as comprising two threshold temperature indicators, 103 and 104, upon reading the present disclosure, it will be understood by one having ordinary skill in the art that at least one is necessary and two are preferred. Though there are several types of indicators, a reliable single use and irreversible indicator uses a wax of a known melting point to trigger a readily visible color change. Using a single use irreversible threshold temperature indicator, at least one is necessary to establish a certain minimum temperature threshold has been reached. And at least two indicators of that type are necessary to test that a minimum temperature threshold has been met, and that a maximum temperature threshold has not been exceeded.

Thus, in some implementations the label comprises at least two threshold temperature indicators. The threshold temperature indicators are preferentially located in close proximity to one another and preferentially positioned near the center of the label. In some implementations, such as slide 100, the two threshold temperature indicators 103 and 104 are comprised of a phase change indicator utilizing a material with an engineered melting point that will liquefy at the specified temperature creating an irreversible and visible color change that alerts the user that the specified temperature has been reached.

In an implementation where the label comprises two threshold temperature indicators, such as slide 100, there is a first threshold temperature indicator 103 having a first temperature threshold and a second threshold temperature indicator 104 having a second temperature threshold. In some implementations, the first and second temperature thresholds are the same. However, in preferred implementations, such as slide 100, the first temperature threshold is set to a lower temperature than the second temperature threshold. In those implementations, the temperature gap created between the first and second temperature thresholds can be tailored to establish a temperature range that is suitable for the temperature validation needs of any particular instrument. A user of those implementations will know that the temperature of the slide pad in the instrument is within the appropriate temperature range when the validation slide shows that the first temperature threshold has been exceeded, but the second temperature threshold has not been exceeded.

Figure 2:
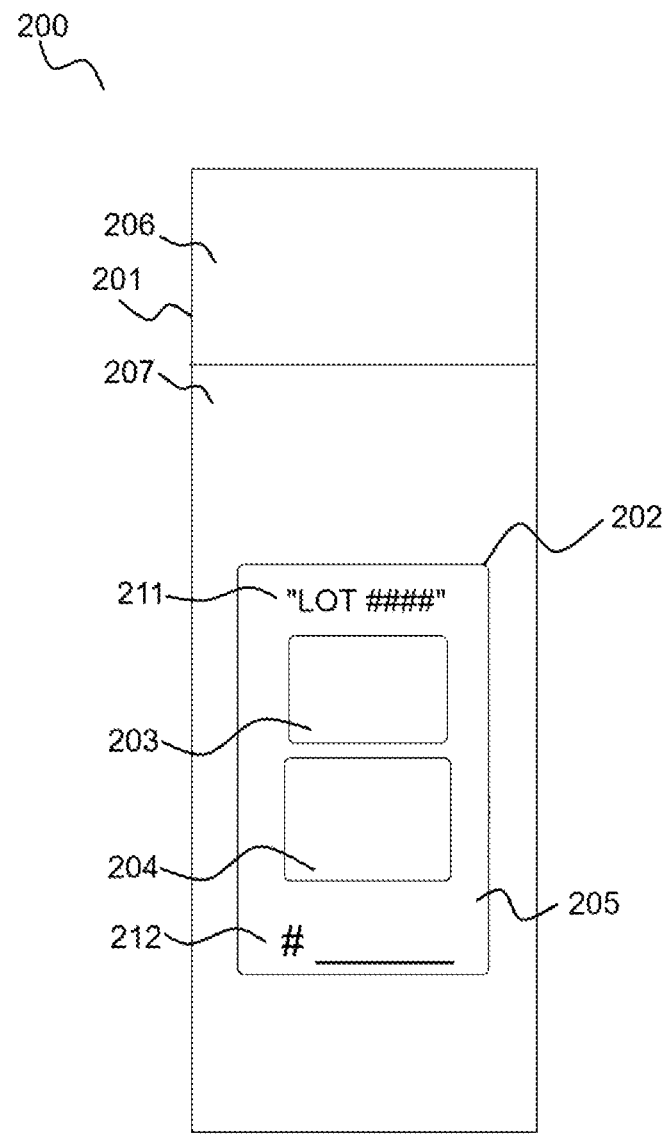
FIG. 2 depicts a second implementation of the temperature validation slide.

In some implementations the substrate comprises an upward facing outer surface area divided into two areas, referred to as the first section and second section. The first section has a first surface area that is distal to and does not include the center of the substrate's upward facing outer surface area. The second section has a second surface area that does include the center and the distal end of the substrate opposite that of the first section. For reference see first section 206 and second section 207 of FIG. 2. In FIG. 2 a second implementation, slide 200, comprises the same functional elements as slide 100. However, slide 200 further comprises a substrate 201 having a first section 206 and a second section 207. The sections 206 and 207 are preferentially delineated on the upward facing surface of substrate 201, however having read the present disclosure, it will be understood by one having ordinary skill in the art that the sections 206 and 207 may extend around the substrate 201.

Still discussing slide 200 and similar implementations, the first section 206 is rendered translucent while the second section 207 is as optically transparent as the substrate properties allow. In implementations where the substrate 201 comprises glass, the first section 206 may be rendered translucent via frosting, which is accomplished by any suitable means such as physical abrasion or chemical etching (and other known methods). The first section 206 in those implementations provides the user with a convenient place to more securely grip and handle the validation slide. The first section 206 is also more readily seen compared to the second section 207 aiding visibility.

Figure 3:
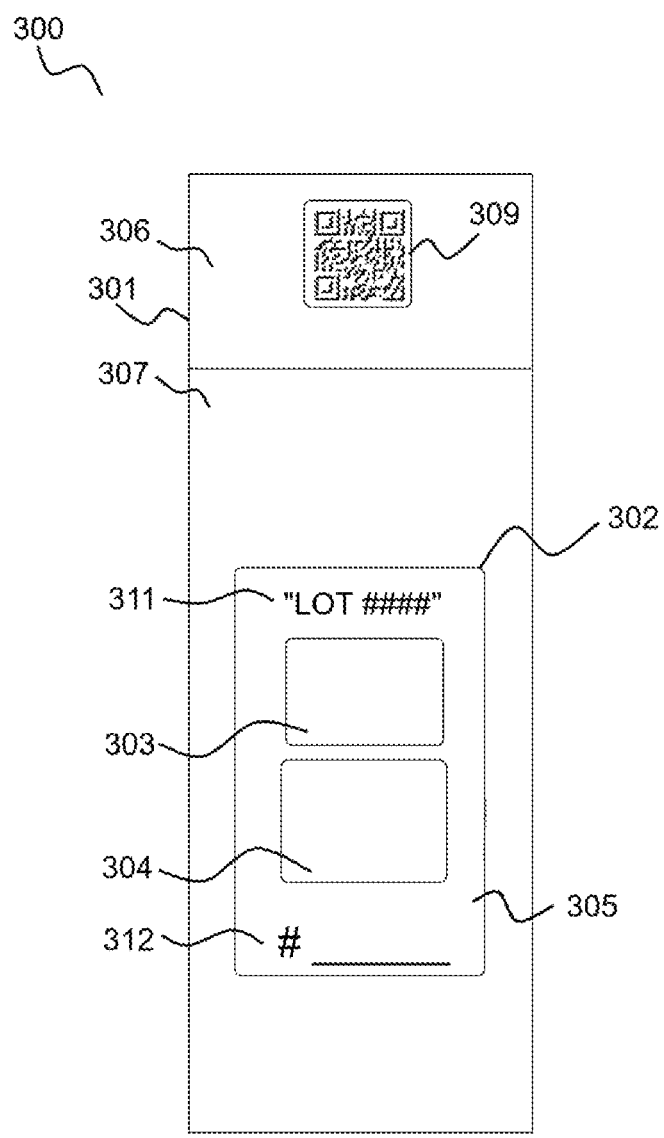
FIG. 3 depicts a third implementation of the temperature validation slide.

In FIG. 3 slide 300, comprises the same functional elements as slides 100 and 200. However, slide 300 further comprises a linked text or graphic 309 that is associated with an external database containing specific information. The information associated with the linked text or graphic 309 is accessed by the user by scanning the linked text or graphic 309 displayed on the validation slide with a scanner equipped with an internet connection, such as a smart phone, tablet, or similar computer device. In slide 300 and similar implementations, the linked text or graphic 309 is positioned in the first section 306 of the substrate 301, whereas the label 302 is positioned in the second section 307 of the substrate 301. Having read the present disclosure, it will be understood by one having ordinary skill in the art that the external database can contain information that may comprise many important or useful items of information such as production batch identifying marks, serial numbers, model numbers, branding information, manufacturing process, unique identifier, properties (such as the threshold temperature of an indicator), use instructions, etc. It will further be understood that the linked text or graphic may be a QR code, a barcode, an image, or simply text.

In some implementations, the label of the validation slide additionally comprises a thermo-chromic visual temperature indicator. In some related implementations the thermo-chromic visual temperature indicator is comprised of a color changing ink that changes in response to temperature. In some related implementations, the thermo-chromic visual temperature indicator is positioned around the threshold temperature indicators. This thermo-chromic visual temperature indicator is useful to the user because it can show spots of relative temperature differences in the area that it occupies. A user of an implementation with the thermo-chromic visual temperature indicator will be alerted visually to hot and cold spots on the slide pad of the temperature validated instrument.

Figure 4:
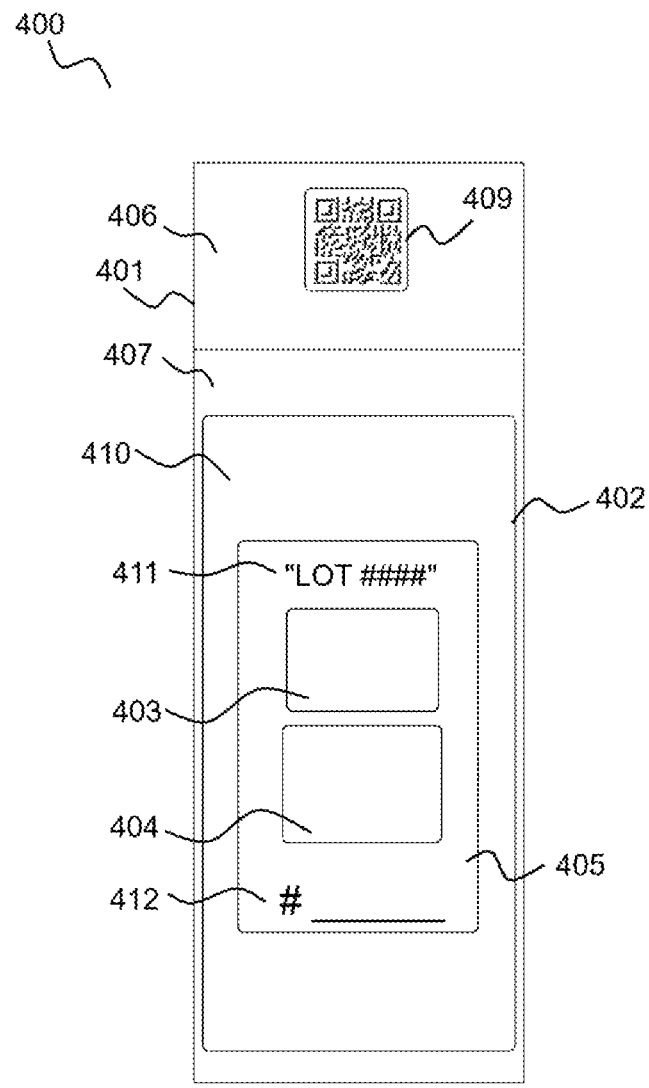
FIG. 4 depicts a fourth implementation of the temperature validation slide.

In FIG. 4, slide 400 comprises the same functional elements as slides 100, 200, and 300. However, slide 400 further comprises a label 402 further comprising a thermo-chromic visual indicator area 410. In this drawing, the thermo-chromic visual indicator area 410 is shown as a border surrounding the first threshold temperature indicator 403, second threshold temperature indicator 404, first area 411, and second area 412.

Although the drawings have shown the label as substantially rectangular, upon reading the present disclosure, it will be understood by one having ordinary skill in the art that many other shapes could be used, thus it is not to be considered a limitation of the present disclosure.

In some implementations the label has at least one portion that does not have adhesive backing to facilitate lifting the edge of the label when a user chooses to peel the label off of the substrate. Using FIG. 5 for reference, in some implementations the label is generally rectangular in shape. In some implementations the label has at least one corner, the at least one corner of the label has no adhesive backing, and the at least one corner of the label has markings indicating the at least one corner can be lifted. For example, the at least one corner may be differently colored compared to the rest of the label background. By providing a removable label, a user can readily remove the label from a validation slide and then secure the label to a maintenance or quality control log book, thereby simplifying and enhancing compliance. This makes record keeping easier to perform and defend because the outcome of the temperature verification can be removed from the substrate and affixed directly to a test log records book or similar entry.

Figure 5:
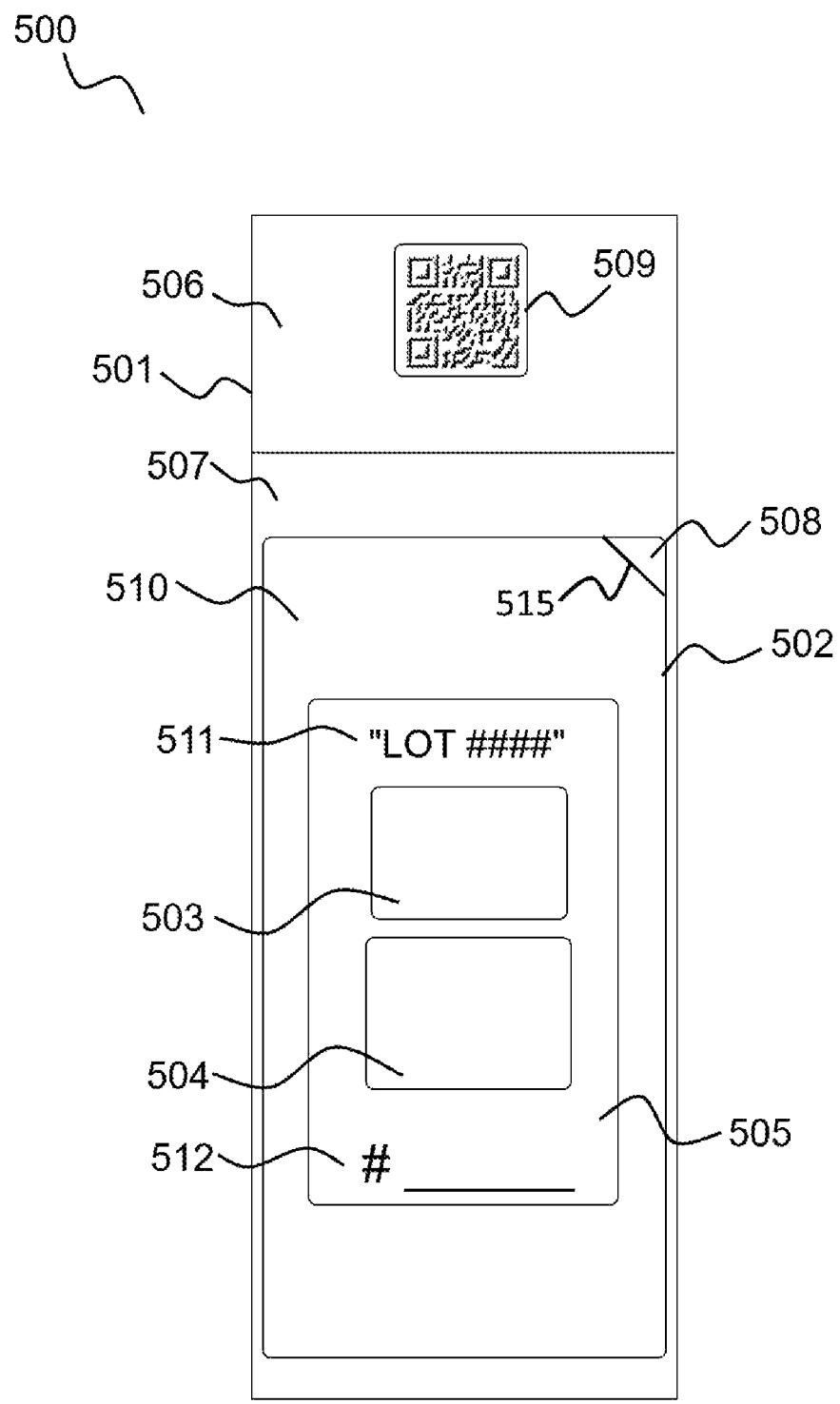
FIG. 5 depicts a fifth implementation of the temperature validation slide.

In FIG. 5 slide 500, comprises the same functional elements as slides 100, 200, 300, and 400. However, slide 500 further comprises a label 502 further comprising an edge 508, wherein the edge 508 is not attached to the substrate 501 by adhesive 515. The edge 508 comprises an indicating mark 515, such as a printed line that delineates the edge 508 from the remainder of the label 502.

In some implementations, the at least one threshold temperature indicator further comprises information. In a preferred implementation, the information on each of the at least one threshold temperature indicators comprises the temperature threshold value of that indicator. The information may be printed on each indicator, or appear sufficiently adjacently to convey to the user that the information is associated with a particular indicator. Upon reading the present disclosure it will be understood by one having ordinary skill in the art that there are alternatives to printing the information that can be readily substituted without material effect.

Figure 6:
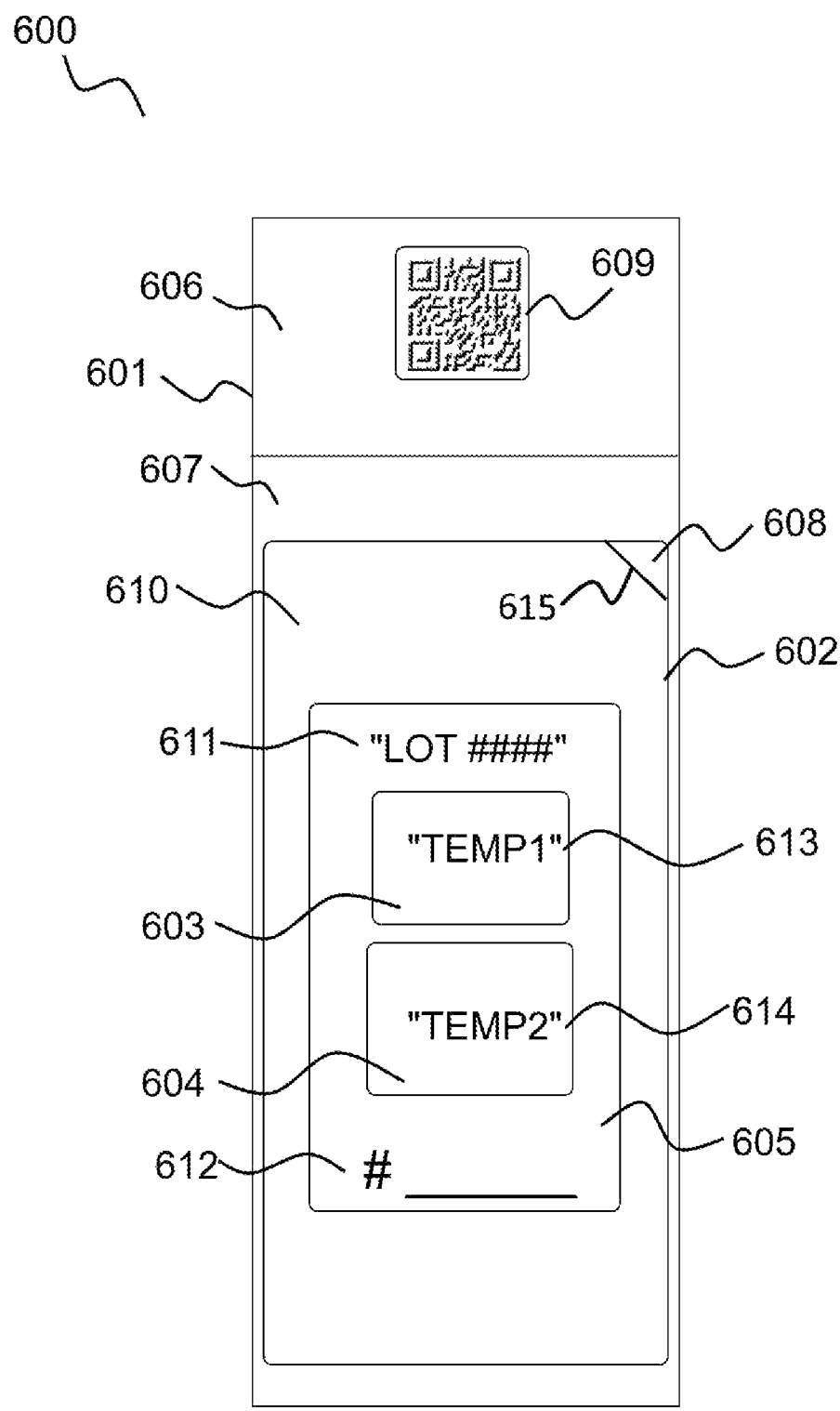
FIG. 6 depicts a sixth implementation of the temperature validation slide.

In FIG. 6 slide 600, comprises the same functional elements as slides 100, 200, 300, 400, and 500. However, slide 600 further comprises a label 602 in which first threshold temperature indicator 603 further comprises a first threshold temperature information 613, and second threshold temperature indicator 604 further comprises a second threshold temperature information 614. In this drawing, first and second threshold temperature information 613 and 614 are printed text.

Although the invention has been described and illustrated with a certain degree of detail or with reference to one or more particular implementations, it is understood that the present disclosure has been made only by way of example. It should be understood that the invention is not intended to be limited to the particular forms disclosed. Furthermore, the invention is amenable to various modifications and alternative forms. Obvious variations and other various changes in the composition, combination, and arrangement of parts can be utilized to by those skilled in the art without departing from the spirit and scope of the invention, as herein disclosed and claimed.

The invention claimed is:

1. A temperature validation slide comprising:
   a substrate, to be used with slide using research and medical diagnostic instruments requiring temperature validation, having a shape that is substantially a flat rectangular prism comprising at least a first face;
   a removable label, positioned on the at least a first face of the substrate, comprising at least two irreversible threshold temperature indicators, a transparent barrier layer, a first area of the label displaying a first set of information, and a second area to receive information; and
   an adhesive attaching the label to the substrate.

2. The temperature validation slide of claim 1 wherein the substrate comprises glass.

3. The temperature validation slide of claim 1 further comprising:
   a displayed text or graphic linked to a database containing information.

4. The temperature validation slide of claim 3 wherein the displayed text or graphic is positioned on a distal end of the substrate and not on the label.

5. The temperature validation slide of claim 1 wherein the removable label is further comprising:
   a thermo-chromic visual indicator area.

6. The temperature validation slide of claim 5 wherein the thermo-chromic visual indicator area is positioned around the at least two threshold temperature indicators.

7. The temperature validation slide of claim 1 wherein the removable label is further comprising:
   at least one edge, wherein the at least one edge is not attached to the substrate by adhesive.

8. The temperature validation slide of claim 7 wherein the at least one edge is further comprising an indicating mark.

9. A temperature validation slide comprising:
   a substrate comprising a first section that is translucent and a second section that is transparent, wherein the second section is larger than the first and includes the center of the substrate, and further wherein the substrate is a flat rectangular prism comprised of glass;
   a removable label, comprising at least two adjacently positioned threshold temperature indicators that have different threshold temperature values, a transparent barrier layer positioned over the at least two threshold temperature indicators, a first area of the label displaying a first set of information, a second area of the label configured to receive information, and at least one edge wherein the at least one edge is not attached to the substrate and wherein the at least one edge comprises an indicating mark;
   an adhesive attaching the label to the substrate such that the label is positioned within the transparent second section of the substrate; and
   a displayed text or graphic linked to a database containing information, where the text or graphic is positioned in the first translucent section of the substrate.

10. The temperature validation slide of claim 9 wherein the removable label is further comprising:
    a thermo-chromic visual indicator area.

11. The temperature validation slide of claim 10 wherein the thermo-chromic visual indicator area is positioned around the at least two threshold temperature indicators.

12. A temperature validation slide comprising:
    a substrate, having a shape that is substantially a flat rectangular prism comprising at least a first face, and further wherein the substrate is comprising a first section that is translucent and a second section that is transparent, wherein the second section is larger than the first;
    a removable label, positioned on the at least a first face of the substrate, comprising at least two threshold temperature indicators, a transparent barrier layer, a first area of the label displaying a first set of information, and a second area to receive information; and
    an adhesive attaching the label to the substrate.

13. The temperature validation slide of claim 12 wherein the substrate comprises glass.

14. The temperature validation slide of claim 12 further comprising:
    a displayed text or graphic linked to a database containing information.

15. The temperature validation slide of claim 14 wherein the displayed text or graphic is positioned on a distal end of the substrate and not on the label.

16. The temperature validation slide of claim 12 wherein the removable label is further comprising:
    a thermo-chromic visual indicator area.

17. The temperature validation slide of claim 16 wherein the thermo-chromic visual indicator area is positioned around the at least two threshold temperature indicators.

18. The temperature validation slide of claim 12 wherein the removable label is further comprising:
    at least one edge, wherein the at least one edge is not attached to the substrate by adhesive.

19. The temperature validation slide of claim 18 wherein the at least one edge is further comprising an indicating mark.

* * * * *